United States Patent [19]

Kitazawa

[11] Patent Number: 5,757,182
[45] Date of Patent: May 26, 1998

[54] VARIABLE-RELUCTANCE-TYPE ANGULAR ROTATION SENSOR WITH SINUSOIDALLY DISTRIBUTED WINDING

[75] Inventor: Kanji Kitazawa, Iida, Japan

[73] Assignee: Tamagawa Seiki Kabushiki Kaisha, Nagano-ken, Japan

[21] Appl. No.: 629,093

[22] Filed: Apr. 8, 1996

[51] Int. Cl.[6] .............................. G01B 7/14; H02K 3/00
[52] U.S. Cl. ......................... 324/207.17; 324/207.25; 310/68 B; 310/111
[58] Field of Search .................... 324/207.17, 207.19, 324/207.25, 174, 173, 207.22, 233; 310/68 B, 111, 179, 184, 168

[56] References Cited

U.S. PATENT DOCUMENTS 3,079,548  2/1963  Robinson ..................... 340/870.31
5,486,731  1/1996  Masaki et al. ................. 324/207.25

*Primary Examiner*—Walter E. Snow
*Attorney, Agent, or Firm*—Sughrue, Mion, Zinn, Macpeak & Seas, PLLC

[57] ABSTRACT

A variable-reluctance-type angle sensor having an output winding wound in each slot on a one-slot pitch basis and in a sinusoidal distribution. The variable-reluctance-type angle sensor is so structured that the number of the poles of exciting windings is equal to the number of slots and that the induced voltage in the output winding corresponding to one phase of n-phase output windings is sinusoidally distributed.

2 Claims, 4 Drawing Sheets

VARIABLE-RELUCTANCE-TYPE ANGULAR ROTATION SENSOR WITH SINUSOIDALLY DISTRIBUTED WINDING

BACKGROUND OF THE INVENTION

1. Field of the Invention

The present invention relates to a variable-reluctance-type angle sensor, and in particular, to improvements in a variable-reluctance-type angle sensor that eliminate harmonic-frequency components, improve accuracy, and permit machine-winding by allowing the output winding to be wound in a distributed manner at slots on a one-slot pitch basis and in a sinusoidal configuration.

2. Description of the Related Art

Conventionally available as one type of angle sensor is a resolver illustrated in FIGS. 1 through 4. Designated 1 in FIG. 1 is a ring-shaped stator having four slots 2, each formed between any two of four neighboring projected poles 3. A single phase exciting winding 4 is wound around each projected pole in the slots beside the poles. A rotor 5 that is formed of iron cores only and without a winding on it is rotatably freely supported within the stator 1. The center of the rotor 5 is off-centered from the center of the stator 1. The rotor 5 is so arranged that permeance of the gap between the rotor and the poles 3 of the stator 1 varies sinusoidally with respect to angle θ.

SIN and COS output windings 6, 7, with an electrical angle of 90° allowed therebetween, are wound around each of the poles 3 in the slots 2 in the stator 1 on a one-slot pitch basis. The SIN output winding 6 gives an SIN output voltage 8 as a sine wave, and the COS output winding 7 gives a COS output voltage 9 as a cosine wave. As shown in FIG. 2, the SIN output winding 6 and the COS output winding 7 are arranged in each slot 2 for single slot excitation, and the exciting winding 4 is arranged sequentially in each slot 2 on a one-slot pitch basis. When an exciting voltage is supplied via the exciting winding 4, the SIN output winding 6 and the COS output winding 7 output the SIN output voltage 8 designated c+D and the COS output voltage 9 designated a+B in response to the rotation of the rotor 5, as shown by a, B, c, D in Fig.4.

The prior art variable-reluctance-type angle sensor thus constructed suffers the following problem.

The prior art variable-reluctance-type angle sensor picks up as a voltage variation the variation in magnetic flux that crosses the output windings. The magnetic flux varies when the gap between the rotor and stator varies. The output voltage changes are respectively proportional to SIN θ and COS θ. Because of tolerance or variations in the configuration of the rotor, harmonic-frequency components take place and accuracy improvements are extremely difficult. A fractional pitch winding may be employed in the output winding as shown in FIG. 3 to remove harmonic-frequency components. This technique, however, requires that the exciting winding and the output windings skip alternately the slots, and thus machine-winding is impossible.

SUMMARY OF THE INVENTION

The present invention has been developed to resolve the above problem, and it is an object of the present invention to provide a variable-reluctance-type angle sensor that eliminates harmonic-frequency components, improves accuracy, and permits machine-winding by allowing the output winding to be wound in a distributed manner at each slot on a one-slot pitch basis and in a sinusoidal configuration.

The variable-reluctance-type angle sensor of the present invention constructed of a stator having an exciting winding and n-phase output windings in the slots in the stator and a rotor rotatably supported relative to the stator, the rotor having an iron core with no winding thereon and having a configuration such that gap permeance between the stator and the rotor varies sinusoidally with respect to angle θ, said angle sensor being characterized in that the number of the poles of the exciting winding equals to the number of the slots, that the output windings are wound so that the voltage induced in each one phase winding of the n-phase windings is sinusoidally distributed, and that the exciting winding and the output windings are wound in the slots on a one-slot pitch basis in a distributed fashion.

In another aspect of the present invention, the variable-reluctance-type angle sensor presents an n-phase excitation/single-phase output structure by using the exciting winding as an output winding and the output windings as exciting windings.

According to the variable-reluctance-type angle sensor of the present invention, the exciting winding and output windings are wound in each slot on a one-slot pitch basis, and the output windings are wound in a distributed fashion so that the distribution of the voltage induced in the output windings is sinusoidal. Therefore, regardless of one-slot pitch winding at each slot, each output winding presents an SIN output voltage and COS output voltage according to the rotation of the rotor.

According to the variable-reluctance-type angle sensor of the present invention, harmonic components from low to high frequencies contained in each induced voltage are reduced. Since each slot is filled with winding on a one-slot pitch basis, machine-winding using a machine is possible.

DETAILED DESCRIPTION OF THE PREFERRED EMBODIMENTS

Figure 1:
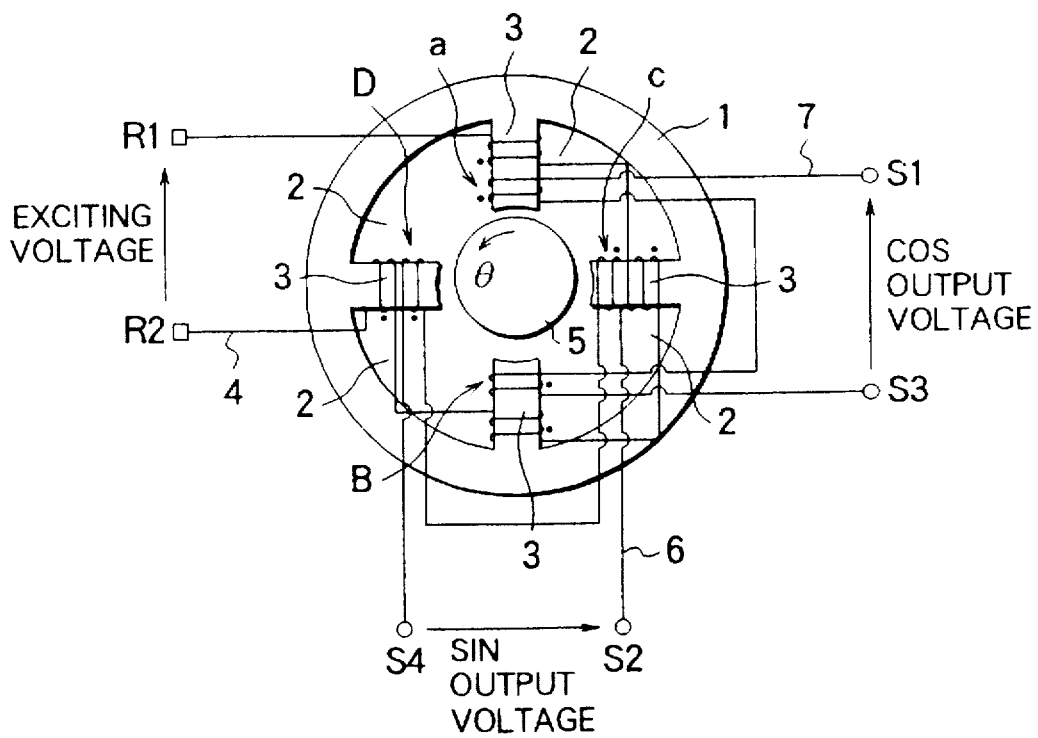
FIG. 1 shows the construction of the prior art angle sensor.
Figure 2:
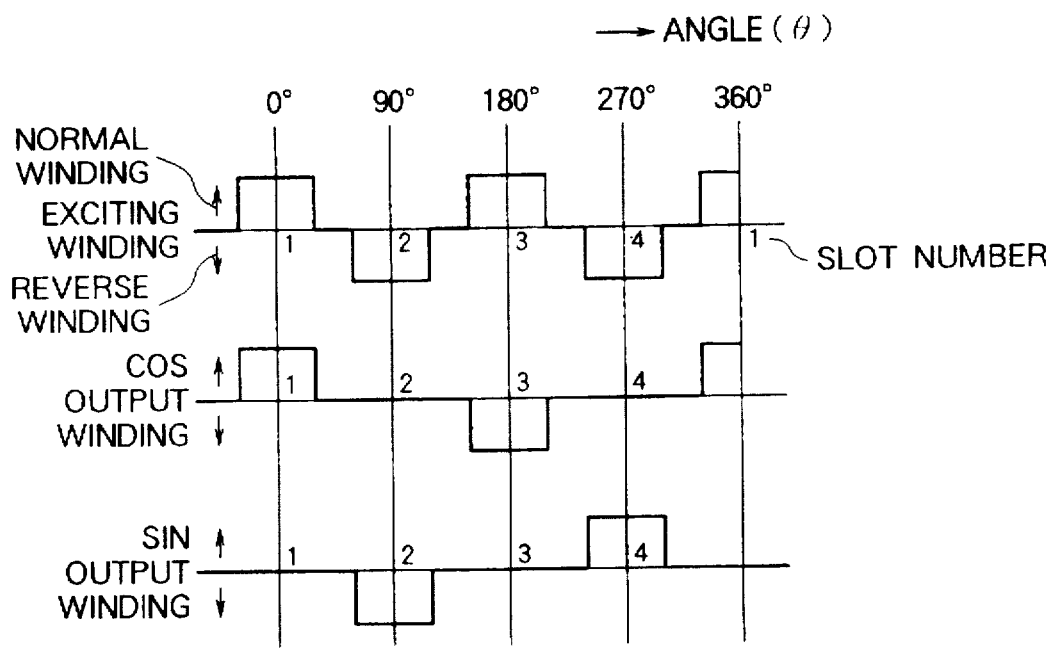
FIG. 2 is an explanatory view showing the winding structure in each slot in the angle sensor of FIG. 1.
Figure 3:
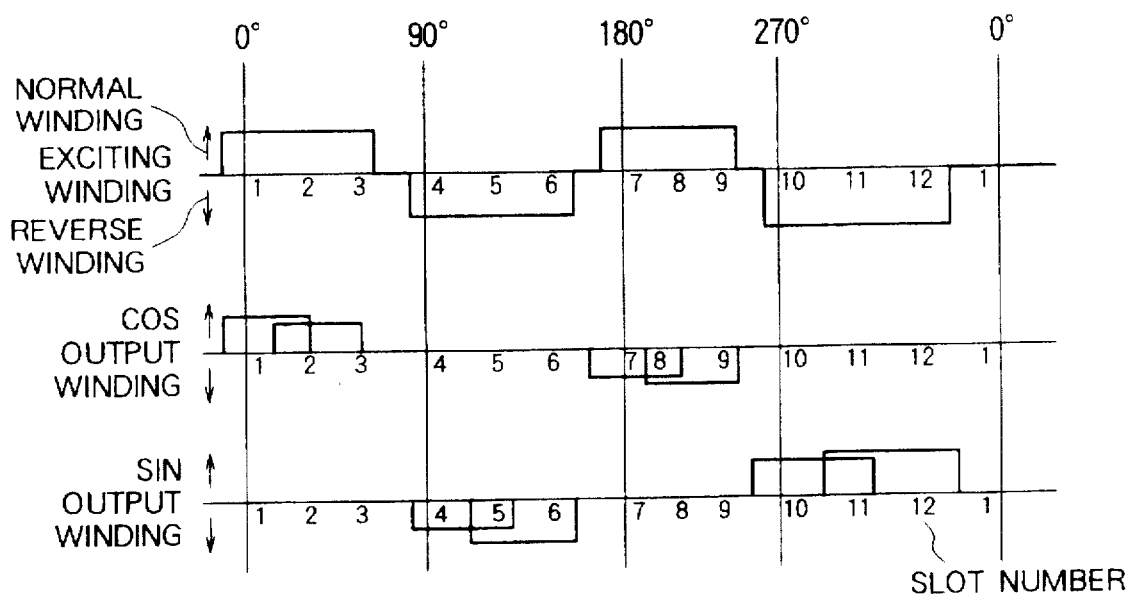
FIG. 3 shows the prior art winding structure.
Figure 4:
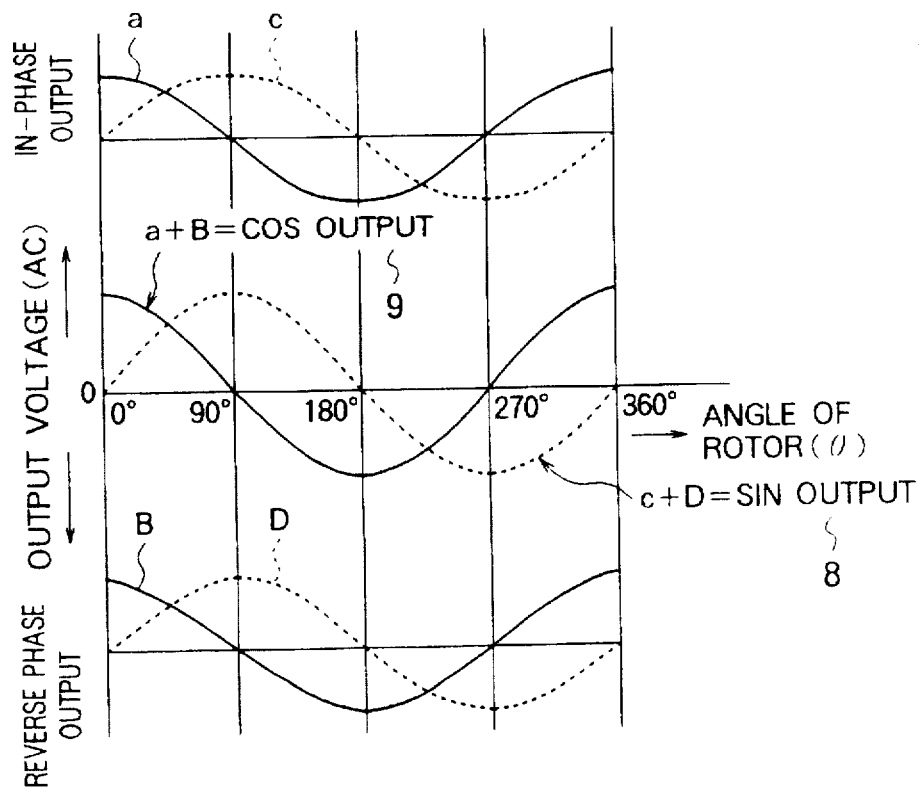
FIG. 4 shows the waveforms of the output voltages of the output windings.

Referring to the drawings, the preferred embodiment of the variable-reluctance-type angle sensor according to the present invention is now discussed. In the discussion that follows, components equivalent to those described with reference to the prior art are designated with the same reference numerals and their explanation will not be repeated.

Figure 5:
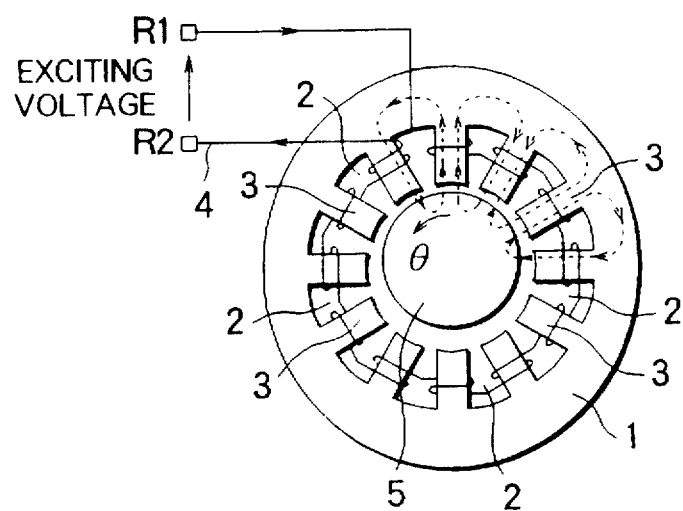
FIG. 5 shows generally the variable-reluctance-type angle sensor according to the present invention.

Designated 1 in FIG. 5 is a ring-shaped stator having 12 projected poles 3, and 12 slots 2, each formed between any two neighboring projected poles 3. An exciting winding 4 of one phase is wound around each projected pole 3 in the respective slots 2. The number of the poles of the exciting windings 4 is equal to the number of the slots 2. A rotor 5 constructed of iron cores without any winding thereon is freely rotatably supported within the stator 1. Since the center of the rotor 5 is off-centered from the center of the stator 1, gap permeances between the rotor 5 and the projected poles 3 of the stator 1 sinusoidally vary with respect to angle θ as is well known in the art. The rotor 5 is not limited to the off-centered structure. Alternatively, the same effect may be achieved by a rotor 5 which is center-aligned but deformed in its shape to have projections and recesses.

Figure 6:
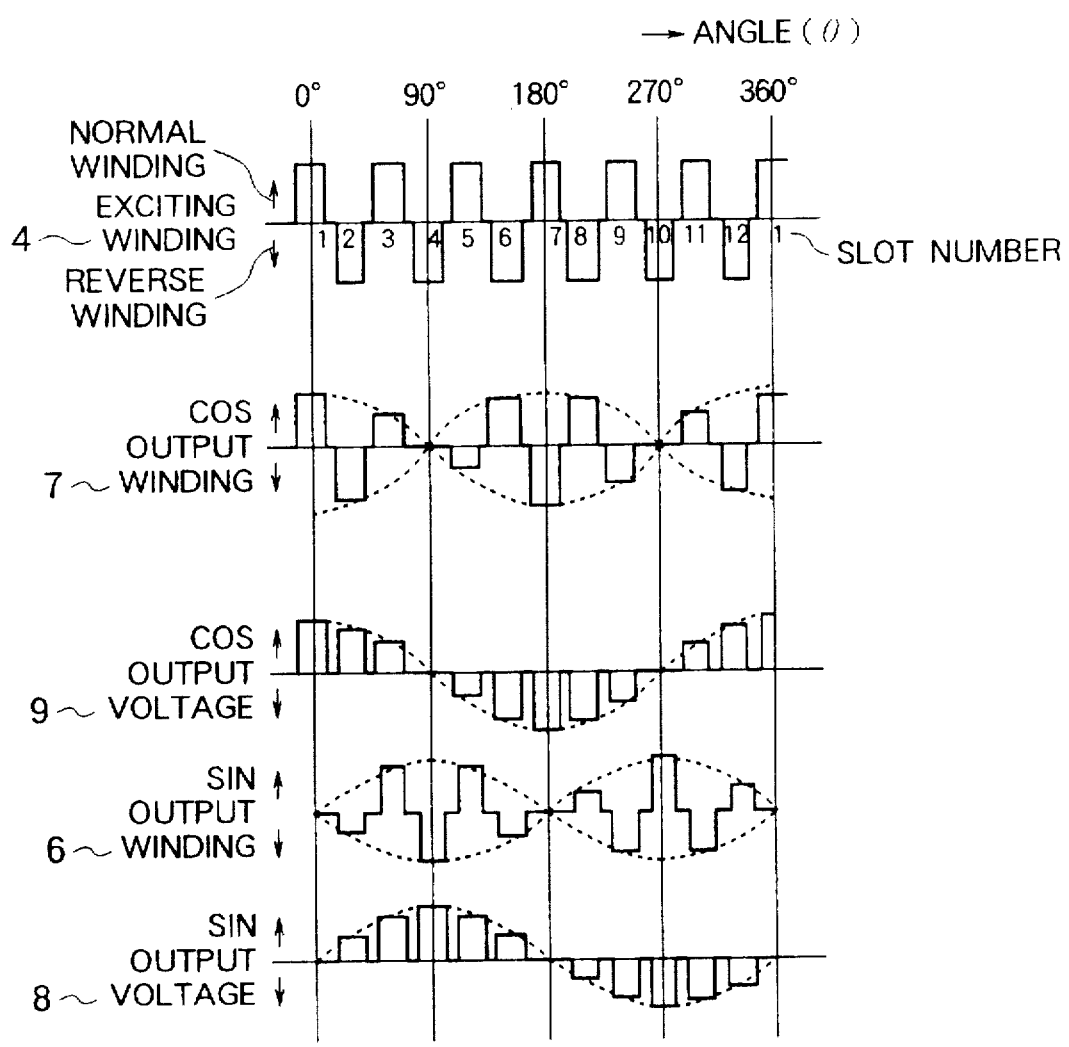
FIG. 6 is an explanatory view showing the winding structure in each slot according to the present invention.

SIN output winding 6 and COS output winding 7, with their two phases having an electrical angle of 90° therebetween, are wound in the slots on a one-slot pitch basis (the slots are filled with respective winding, sequentially rather than in an alternately skipped fashion). As shown in FIG. 6, though not shown in FIG. 5, the SIN and COS output windings 6, 7 are wound in a distributed manner so that each of induced voltages is sinusoidally distributed (the number of the turns (or the quantity) of each winding is also distributed in a sinusoidal manner).

The numbers of the turns of the output windings 6, 7 are proportional to SIN θ, COS θ, respectively. Their polarities are arranged in consideration of the polarities of the exciting windings so that the polarities of the SIN and COS output windings 6, 7 agree with the polarities of the SIN and COS output voltages 8, 9 at each of the slot positions.

As shown in FIG. 6, the exciting winding 4 in normal winding and the output windings 6, 7 in normal winding result in in-phase output, the exciting winding 4 in normal winding and the output windings 6, 7 in reverse winding result in reversed-phase output, the exciting winding 4 in reverse winding and the output windings 6, 7 in normal winding result in reversed-phase output, and the exciting winding 4 in reverse winding and the output windings 6, 7 in reverse winding result in in-phase output. The polarities of the output windings 6, 7 are determined (the positive pole is given by a reverse winding) so that SIN output voltage 8 and COS output voltage 9 agree with sine wave and cosine wave, respectively.

The construction in FIG. 5 illustrates 1X, two-phase output (X means number of multiple). The present invention is applied to n-phase output type and multi-pole output type (2X or greater). The present invention is not limited to the above-described 12-slot type, and a different number of slots may be used. FIG. 5 illustrates one-phase excitation/n-phase (2-phase) output. Alternatively, the excitation side and output side may be reversed. Namely, an arrangement of n-phase (2-phase) excitation/one-phase output may be incorporated.

The variable-reluctance-angle sensor thus constructed according to the present invention offers the following advantages. The output windings are wound on a one-slot pitch basis and the numbers of the turns (the quantity) of the output windings are set to agree with a sinusoidal distribution. The harmonics from low to high frequencies contained in the output voltages (induced voltages) are reduced, and thus angle sensor accuracy is improved compared to the prior art (to the error level half to one-fifth that of the prior art). Since the sinusoidal distribution is arranged by one-slot pitch winding, winding is automated using machine-winding. This results in a substantial cost reduction.

What is claimed is:

1. A variable-reluctance-type angular rotation sensor, comprising:

a) a multi-pole stator having an exciting winding and n-phase output windings around the poles in slots of the stator, and b) a rotor rotatably supported relative to the stator, the rotor having an iron core with no winding thereon and having a configuration such that a gap permeance between the stator poles and the rotor varies sinusoidally with respect to a rotation angle, wherein:

i) the number of stator poles is equal to the number of stator slots, ii) the number of output winding turns is sinusoidally distributed among the stator poles so that the voltages induced in each phase winding of the n-phase windings are sinusoidally distributed, iii) the exciting winding and the output windings are wound in the slots on a one-slot pitch basis in a distributed fashion, and iv) output winding polarities are arranged with exciting winding polarities such that the output winding polarities agree with the polarities of the voltages at each slot.

2. The variable-reluctance-type angular rotation sensor according to claim 1, wherein an n-phase excitation/single-phase output configuration is implemented by using the exciting winding as an output winding and the output windings as exciting windings.

* * * * *